United States Patent [19]

Jahnke

[11] Patent Number: 5,026,318
[45] Date of Patent: Jun. 25, 1991

[54] METHOD AND APPARATUS FOR GUTTING NON-DECAPITATED FISH

[75] Inventor: Joachim Jahnke, Lübeck, Fed. Rep. of Germany

[73] Assignee: Nordischer Maschinebau Rud.Baader GmbH+Co K.G., Lubeck, Fed. Rep. of Germany

[21] Appl. No.: 523,335

[22] Filed: May 14, 1990

[30] Foreign Application Priority Data

May 16, 1989 [DE] Fed. Rep. of Germany ....... 3915815

[51] Int. Cl.5 ............................................. A22C 25/16
[52] U.S. Cl. ...................................... 452/116; 452/121
[58] Field of Search ............... 452/116, 106, 110, 119, 452/121, 122

[56] References Cited

U.S. PATENT DOCUMENTS

| 3,187,376 | 6/1965 | Laws | 452/106 |
| 3,264,681 | 8/1966 | Bartels | 452/121 |
| 4,091,506 | 5/1978 | Sorensen et al. | 452/116 |
| 4,815,167 | 3/1989 | Emanuelsen | 452/121 |

FOREIGN PATENT DOCUMENTS

| 1579427 | 1/1971 | Fed. Rep. of Germany . |
| 2232633 | 3/1973 | Fed. Rep. of Germany . |
| 2530013 | 1/1976 | Fed. Rep. of Germany . |
| 2832259 | 10/1979 | Fed. Rep. of Germany . |
| 3327968 | 2/1985 | Fed. Rep. of Germany ...... 452/116 |
| 3343789 | 6/1985 | Fed. Rep. of Germany . |
| 2616625 | 12/1988 | France ................................. 452/106 |

Primary Examiner—Willis Little
Attorney, Agent, or Firm—Fay, Sharpe, Beall, Fagan, Minnich & McKee

[57] ABSTRACT

In a method and an apparatus for gutting non-decapitated fish, in particular breeding fish such as trout, it is characteristic for the processing that the fish are conveyed with their tails leading in longitudinally aligned conveyor troughs, and the treatment of the fish comprises the processing steps of slitting the belly cavity from the anus up to the region of the belly cavity; spreading the belly flaps and tearing open of the bloodstream; collecting and sucking off the entrails; and tearing off the gullet in the area of the mouth cavity. This processing can selectively be combined with the removal of the gills. For correctly performing this process, the cutting tool for slitting the belly cavity is provided with lateral knife blades, which sever the intestine in the anal region, while the suction nozzle is designed as a clamping mechanism in order to tear off the gullet.

20 Claims, 2 Drawing Sheets

METHOD AND APPARATUS FOR GUTTING NON-DECAPITATED FISH

BACKGROUND OF THE INVENTION

1. Field of the Invention

The present invention relates to a method for gutting non-decapitated fish, in particular breeding fish such as trout, by opening the belly cavity through slitting the belly walls surrounding the belly cavity, beginning in the anal region, along the belly seam, as well as an apparatus for carrying out the method, comprising a conveyor, including at least one fish receptacle for the fish to be processed, which supports said fish at least by its back and pushes it with the tail thereof leading, as well as processing means, which can be moved in a controlled manner with regard to the path of the fish for the purpose of processing the fish according to said method, said processing means comprising a cutting tool, which is driven to rotate, for opening the belly cavity in the area between the anus and the gill cavity, a spreader for the spreading of the belly cavity walls, and means for removing the entrails by a suction effect.

In the gutting of fish, particularly of this species, it is important that through this process the belly cavity is freed from all entrail parts, which also includes the removal of the bloodstream (kidney). In such a process, it is of decisive importance that the inner walls of the belly remain intact. Moreover, during this process it is required to provide, in a simple manner, whether or not the gills remain in the fish. Based on the anatomical structure a favourable prerequisite therefor lies in performing a processing from the anus towards the head.

2. Related Art

Apparatuses are known which function according to such a principle.

For example, an apparatus is known from DE-PS 28 32 259 by which the fish is conveyed in a troughed chain, whilst lying on its back and by means of pushing on its head end with its tail end leading, through the area in which the processing tools are active. The processing takes place through controlled movement of the processing tools into the transport path of the fish. Therein, the aim is pursued, following the slitting of the belly wall, to bloat the entrails through supplying water to the belly cavity, and to remove them by means of suction pumping. Due to the structure of the suction pump tool, removal of the gills is not possible and a complete removal of the gullet is not ensured.

The apparatus constituting the subject matter of DE-OS 22 32 633 also leads to the same result. Therein, transport of the fish takes place under a pulling effect produced by means of a conveyor which seizes the tail of said fish.

Another prior art constuction of such type can be taken from DE-PS 33 43 789, which shows an apparatus by which the fish are gripped behind the gill cover and conveyed with the head leading. Following the opening of the belly cavity, a suction nozzle moving with the fish is inserted into said cavity in the region of the gill cavity and during their joint movement and by means of knife elements located on the suction nozzle and movable under control, the gullet is severed.

An apparatus for removing of the gills and entrails can be taken from DE-OS 15 79 427. With this apparatus, the fish are conveyed with the head leading and via clamping thereon, the fish first being provided with two incisions performed transversely with regard to the conveying direction in the regions of the lower jaw and of the gill cavity. Thereafter, the belly cavity is opened between the gill cavity incision and the anus, the bridge of meat located between the gill cavity incision and the lower jaw incision is seized by a pincer tool and the gills and entrails are torn out.

DE-OS 25 30 013 shows a similar device.

It is disadvantageous in these devices that correct processing is dependent upon very exact positioning of the fish; this positioning, however, cannot be guaranteed due to the natural proportional deviation of the fish. In addition, due to their function, the tools are, in part, costly and delicate.

3. Objects of the Invention

It is the main object of the present invention to improve mechanical gutting such that a highly efficient, faultless work result can be accomplished with fish of varying sizes.

A further main object of the present invention is to enable the removal of the entrails, selectively, with or without the gills, by simple adjustment whilst considering the aforementioned conditions.

SUMMARY OF THE INVENTION

In a method by which the belly cavity is opened by slitting the belly walls surrounding the belly cavity from the region of the anus, along the belly seam, and in which the entrails are removed through suction whiist being continously collected from the anus towards the head, these objects are achieved in that the intestine in the region of the anus is released from the belly walls simultaneously when opening the belly cavity, and that the gullet and, selectively, the gills, are seized in a clamping manner and torn off in the region of the mouth cavity.

To carry out this process in a most suitable manner by an apparatus comprising a conveyor, including at least one fish receptacle for the fish to be processed, which supports said fish at least by its back and pushes it with the tail thereof leading; as well as processing means, which can be moved in a controlled manner with regard to the path of the fish for the purpose of processing the fish according to said method, said processing means comprising a cutting tool, which is driven to rotate, for opening the belly cavity in the area between the anus and the gill cavity, a spreader for the spreading of the belly cavity walls, and entrail removing means for removing the entrails by a suction effect, such apparatus is characterised in that the cutting tool for opening the belly cavity comprises a circular knife and knife blades associated with the flanks of the circular knife and extending essentially radially up to the vicinity of the cutting edge of the circular knife; that the entrail removing means by vacuuming include a suction nozzle having a suction opening arranged opposing the conveying direction of the fish; and that between the cutting tool and the suction nozzle, a scraping tool is arranged for at least partially opening the fish's bloodstream.

For securing, positioning and aligning the fish to be processed, the conveyor can comprise individual, successively arranged conveying troughs, which can be provided at their leading end with a controlled clamping mechanism for the tail area of the fish and whose trailing end is provided with a head stop, reaching over the lower jaw of the fish. The use of such conveyor troughs enables the use of a rigid cam drive or mechanism, driven synchronously with the conveyor and of simple design, for controlled movement of the means for processing the fish, wherein the conveyor, for the sake of an easy handling and processing of fish of varying sizes as regularly occurring when batches of breeding fish are to be processed, may be equipped with differently sized conveyor troughs for receiving fish of different sizes. In such embodiment the conveying troughs for receiving the fish can be designed preferably based on the size of the fish to be processed, relative to the path of controlled movement predetermined by the cam drive, in particular, that of the cutting tool for opening the belly cavity, with regard to the level of their bottom surface supporting the backs of the fish and also with regard to the position of the head catch. To simplify the feeding of differently sized fish to differently sized troughs, the fish troughs can be identified by varying coloration with regard to different units of size.

A proven cutting tool for opening the belly cavity is a circular knife having a cutting edge generated by symmetrical chamfering. The knife blades, positioned to lie flatly against the flanks of the circular knife, have at least one edge leading in the direction of rotation of the circular knife, which edge is sharpened by means of a knife blade chamfer, at least in the area of its portion projecting into the area of the chamfer of the circular knife, the knife blade chamfer being arranged on the face of the knife blade facing the flank of the circular knife. The bloodstream can be opened by means of a scraper which comprises a spattle or spade-shaped element having anexternal contour adapted essentially to the crosssection of the belly cavity, which element is provided with a sharp contour edge, at least in its area which immerses to the greatest depth into the belly cavity of the fish, which edge is positioned to oppose the direction of movement of the conveyor troughs.

For safe and accurate receiving of the entrails, the suction nozzle can be provided with a suction opening which is positioned to oppose the direction of movement of the conveying troughs and can comprise a housing essentially adapted to the cross-section of the belly cavity on the housing portion thereof entering into the cavity.

It is particularly effective in this respect if the part of the suction nozzle which enters into the belly cavity of the fish is provided with a shovel-shaped annex portion or projection. In the event that the gills should remain in the fish, a suction nozzle would preferably be used formed such that the lateral boundary surfaces of the shovel-shaped attachment constitute deflecing edges which, from its leading end, ascend in the direction of movement of the conveyor troughs, said edges causing a deflection of the gill organ upon withdrawal of the suction nozzle from the belly cavity. For co-removal of the gills, a suction nozzle can be used in which the shovel-shaped annex portion is formed as a flat spoon so that it is able to engage underneath the gill organ and, in connection with a separately movable clamping apparatus associated with the shovel-shaped projection for temporarily securing the entrails, to tear these out together with the gills.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

FIG. 6 shows an axonometric illustration of the suction nozzle (41) as provided for joint removal of the gills and entrails;

FIG. 7 shows a sectional plan view of the cutting tool (22), viewed vertically in the direction of the knife blades (26).

DETAILED DESCRIPTION OF THE DRAWINGS

Figure 1:
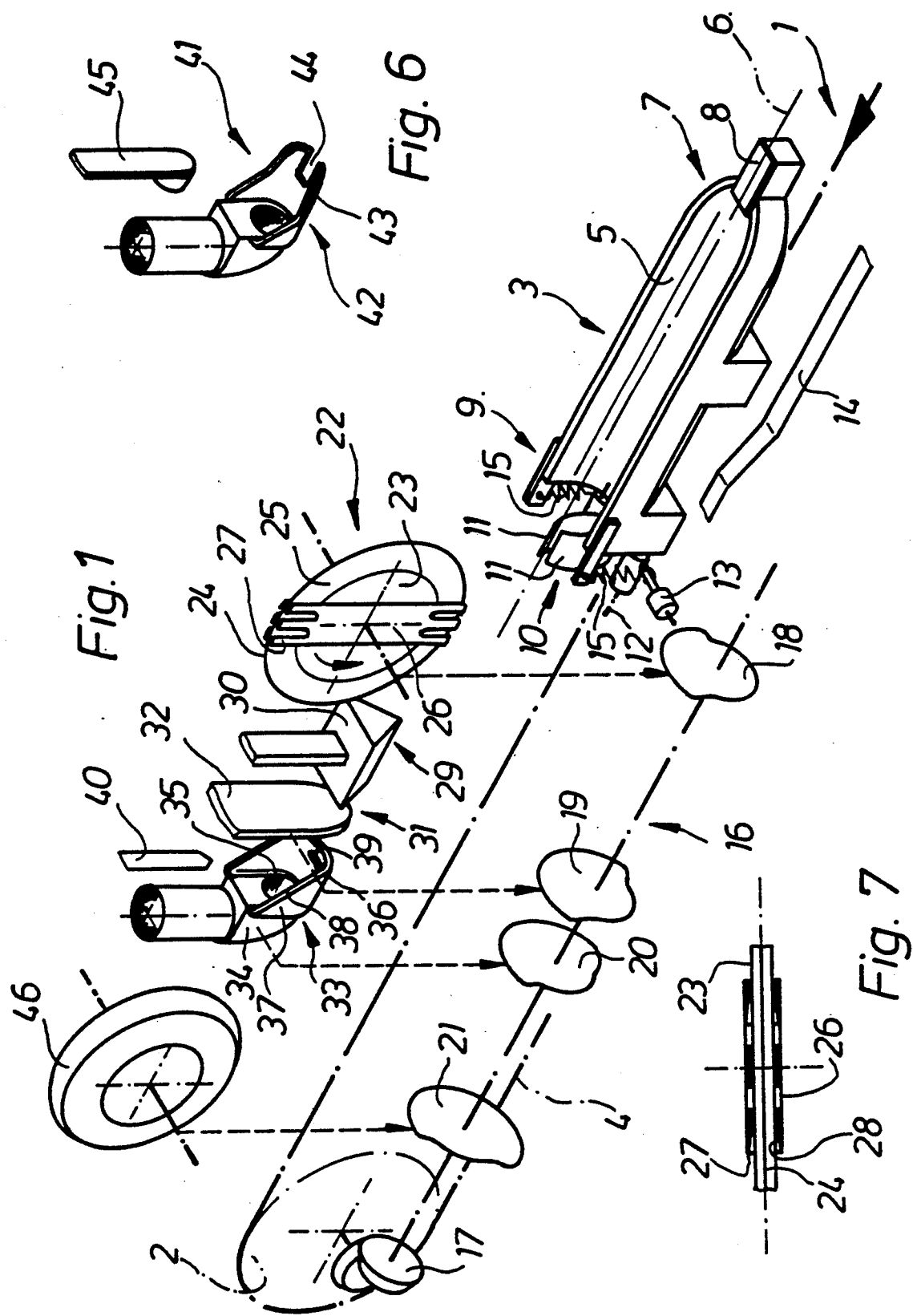
FIG. 1 shows the working area of the means for processing as an excerpt from the complete apparatus illustrated axonometrically and in a simplified manner.

An endless chain conveyor 1, appropriately driven in a continuous manner and turned about two deflection wheels 2, is arranged in a non-represented machine frame of a processing machine for fish. This conveyor is equipped with fish receptacles 3 for the purpose of receiving fish to be processed, which receptacles are secured on not shown sleds or carriers located and mounted at uniform spacings on the conveyor chain 4. The fish receptacles 3 are essentially constituted by conveying troughs 58 which are upwardly open, their plane of symmetry try oriented in the direction of movement (see arrow in FIG. 1) of the chain conveyor 1. Each conveying trough 5 is designed in a closed manner on its trailing frontal end 7 and provided there with a head stop or catch 8. Associated with the leading end 9 of each conveying trough 5 is a clamping mechanism 10 in the form of a rump or body clamp, which comprises two bowl-shaped or curved gripper legs 11 having inner surfaces designed to allow firm gripping, e.g. being roughened, which legs are mounted to swivel symmetrically with regard to the plane of symmetry 6 of the conveying troughs 5 about axes 12 which are oriented parallel to the direction of movement of the chain conveyor 1. The gripper legs 11 can be moved into their open position, against the force of springs 15 and by roller levers 13 connected therewith through control guides 14, which are secured to the frame.

Further, a cam drive 16 is located in the not shown frame, which is driven by a bevel gear 17, which is connected functionally with one of the deflection wheels 2. The cam drive 16 is equipped with cam disks 18, 19, 20, 21, which communicate with appropriate transmission rods not shown in detail but only indicated by broken lines, said rods following the movement of the cam and being functionally connected with tools which are mounted above the path of the conveying troughs 5 and which can be moved into the plane of symmetry 6 thereof. In the sequence of their activation, the tools comprise a cutting tool 22, which is driven to rotate and moved by the first cam disk 18, said cutting tool having a circular knife, the cutting edge 24 of which is produced by symmetrical chamfers 25. The circular knife 23 has knife blades 26 lying flatly on its flanks, which extend essentially radially and into the vicinity of the cutting edge 24 of said circular knife. The leading edges 27 of the blades, in the region of the chamfer 25, are sharpened by means of a chamfer 28, respectively, which is arranged on the face of the flanks of the knife blades 26 facing the circular knives 23. The knife blade 26 is preferably fanned out finger-style and the trailing finger is sharpened on its leading edge in the same manner as edge 27.

Following the cutting tool 22 is a spreader 29, which is formed as a roof-shaped block 30 with its ridge facing towards the conveying troughs 5 and within their plane of symmetry 6. The spreader 29 together with a following scraper 31, forms a cam-only controlled unit moved by the second cam disk 19. In this arrangement, however, the spreader can be displaced out of the path of the conveying troughs 5 against the force of springs or gravity. The scraper 31 essentially consists of a spattle or spade-shaped element 32, oriented transverse to the plane of symmetry 6, with its contour edge positioned opposed to the direction of movement of the conveying troughs 5 and being formed with sharp edges.

The following tool is a suction nozzle 33, which can be moved in a controlled manner by means of the third cam disk 20 with respect to its height level relative to the path of the conveyor troughs 5. This suction nozzle 33 is connected to an appropriate, not shown sucking device. It comprises a housing 34 having the shape of a quarterarch of a tube with an upwardly projecting connecting stud for the sucking device. It is aligned such that a suction opening 35 thereof is directed counter to the direction of movement of the chain conveyor 1. The wall of the housing 34 bounding the suction opening 35 in its lower area is projecting forwardly and forms a shovellike annex portion 36 having lateral bounding faces 37, which, towards the suction opening 35, i.e. in the direction of movement of the conveyor troughs 5, has rising deflecting edges 38. In its shovel face, the annex portion 36 is provided with a slot-shaped opening 39, into which a holding tongue 40 having a corresponding cross-section may be introduced. For this purpose, this tongue 40 is arranged on a non-shown mounting for the suction nozzle 33 in a manner to be moved in the direction of controlled movement of the nozzle. If necessary, a spring may be provided which tends to hold the holding tongue 40 in engagement with the opening 39.

In place of the suction nozzle 33 shown in FIG. 1, a suction nozzle 41 can be used which corresponds to the embodiment shown in FIG. 6. This nozzle, however, is provided with an annex portion 42, which is formed as a flat spoon 43, the forward-facing edge of which is formed forkshaped, by means of a gap 44. When the suction nozzle 41 is in use, a clamping holder 45 is used in place of the holding tongue 40, which clamping holder is able to constitute a clamping device with the spoon face.

The row of tools terminates with a brush 46 which is driven to rotate, the position of which is controlled by the fourth cam disk 21.

The method of operation of the apparatus will now be described via following the fish through the apparatus. The essential stations can be taken from FIGS. 2 to 5.

The fish is placed into the conveying trough 5 with its back downwards and its tail leading. It is important that the head catch 8 engages over the lower jaw of the fish. The placing of the fish into the trough takes place in a feeding area of the apparatus in which the control guides 14 provide that the clamping mechanism 10 located on the leading edge 9 of the conveying troughs 5 is opened. The overall length of the selected fish concurs with the conveying trough 5, so that the tail area of the fish comes to lie in the region of the clamping mechanism. The conveying trough 5, loaded in this manner, is now advanced into the working area of the tools, which are held in readiness over the path of the conveying troughs 5 through the effect of the cam drive 16. Prior to reaching the first tool, the roller levers 13 of the clamping mechanism 10 have run off from the control guides 14 and have thus enabled the closing of the gripping legs 11 by means of the springs 15, so that the fish is now held in the tail area as well.

Figure 2:
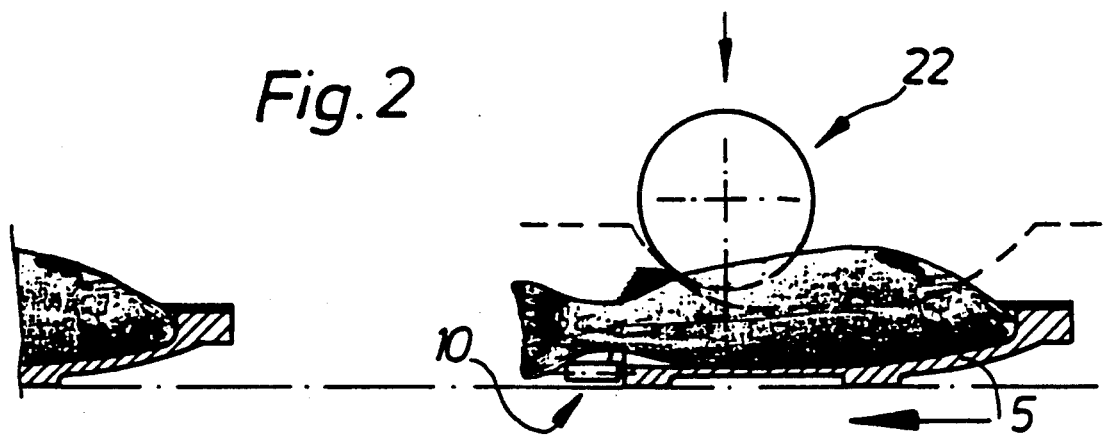
FIG. 2 shows a longitudinal section through the working area of the means for processing at the moment of entry of the cutting tool (22) into the belly cavity.

Next, according to FIG. 2, the controlled introduction of the cutting tool 22 takes place. Because the first cam disk 18 which controls this step is coordinated with the position of the trailing frontal end 7 of the conveying trough 5 and its contour is adapted to the anatomy of the corresponding fish size, the circular knife 23 of this tool now enters into the belly cavity at the anus of the fish and leaves said cavity in the region of the gill cavity, as is indicated with broken lines. In such a process, it must be attended to that the intestine is loosened at the anus, otherwise, a thorough removal of the entrails is not possible.

This task is taken over by the knife blades 26 mounted on the flanks of the circular knife 23, which ensure a thorough loosening of the intestine as a result of their sharpened edges 27.

Figure 3:
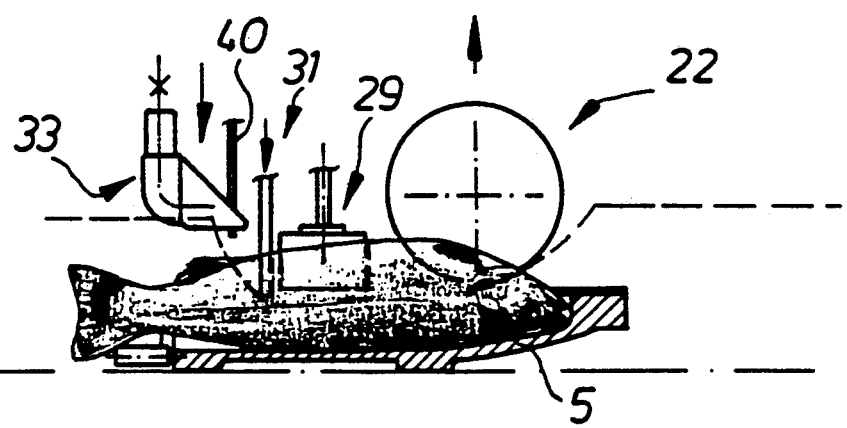
FIG. 3 shows a longitudinal view according to FIG. 2 with the spreader (29) and scraper (31) both introduced into the belly cavity.

In the further advancement of the fish, according to FIG. 3, now the control unit which comprises the spreader 29 and the spade-shaped element 32 is moved over the second cam disk 19 into the path of the conveying trough 5. In this step, the spreader 29 moves ahead slightly in order that the belly flaps of the opened belly cavity are spread open before the spade-shaped element 32 enters into said cavity. In this process, the path of entry of this element is dimensioned such that it touches down, spring-loaded, upon the bloodstream which is lying on the spine and tears said bloodstream open with the sharpedged contour edge.

Figure 4:
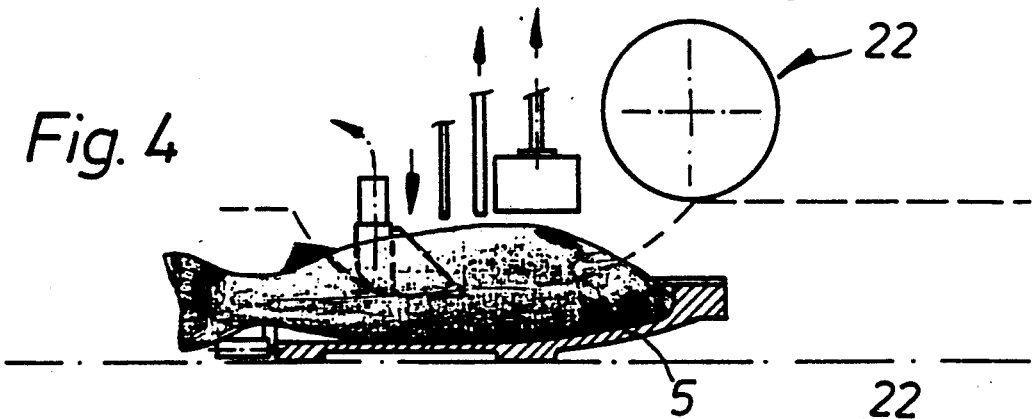
FIG. 4 shows a longitudinal view according to FIG. 2, following the entry of the suction nozzle (33) into the belly cavity.
Figure 5:
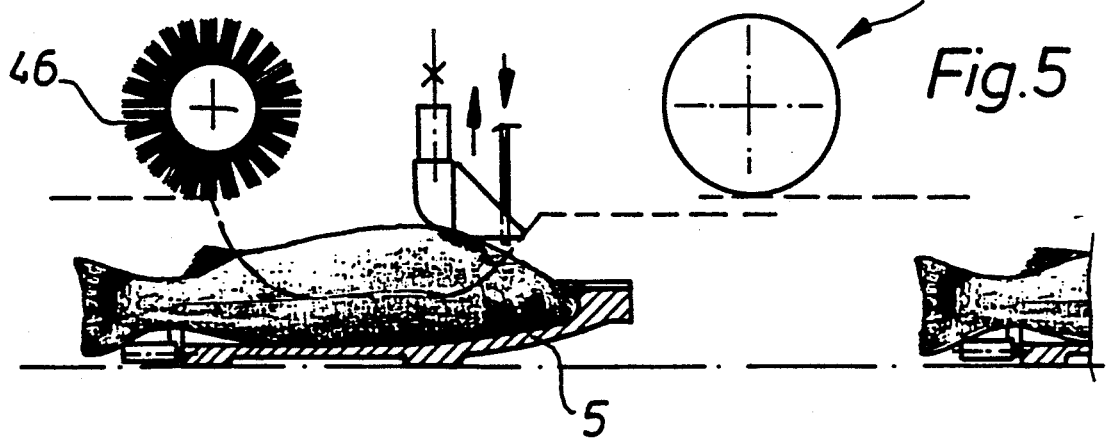
FIG. 5 shows a longitudinal view at the moment of the withdrawal of the suction nozzle (33) out of the belly cavity.

During this process, according to FIG. 4, the suction nozzle 33 begins, being moved under control by the third cam disk 20, to lower into the path of the conveying trough 5 and immerses into the belly cavity, which is still being held open by the spattle-shaped element 32 and the spreader 29. At this moment, these elements are moved out of the belly cavity and, simulaneously, the suction nozzle 33 is supplied with vacuum. As becomes evident from FIG. 4, the holding tongue 40 has stayed behind during the lowering of the suction nozzle 33, which function is achieved by its being supported by one of the non-shown guide rails mounted on the conveying trough 5. By means of the vacuum, the entrails are now drawn into the suction nozzle 33 and therewith, in effect, collected. Shortly before withdrawal of the suction nozzle 33 from the belly cavity, which takes place approximately in the region of the gill cavity, the holding tongue 40 is released, as is shown in FIG. 5, so that it moves against the shovel face/surface of the annex portion 36, assisted by spring force. Thus, by means of penetration of the opening 39, the holding tongue 40 effects a positive clamping of the gullet and the entrails, so that these are torn off upon withdrawal of the suction nozzle 33 from the belly cavity. At approximately the same time, the brush 46 is moved into the belly cavity by the fourth cam disk 21, this entry being facilitated by means of a not-shown spreading sheet or tray.

The processing procedure described above leads to an accurately gutted fish, in which the gills are still contained therein. This is safeguarded in that the suction nozzle 33 is withdrawn from the belly cavity at the right time and in that, as a result of the structuring of the lateral boundary surfaces with deflecting edges 38 an engagement underneath the gill organ is not possible. In the event that the gill organ is to be removed, however, in place of suction nozzle 33, suction nozzle 41, shown in FIG. 6, and instead of the holding tongue 40, a clamping holder 45 are to be used. In addition, the third cam disk 20 must be altered with regard to delaying the moment of withdrawal, which alteration can take place through removal of the third cam disk 20 and introduction of another appropriate cam disk. The suction nozzle 41 initially functions in the same manner as suction nozzle 33. However, shortly prior to withdrawal from the gill cavity, the nozzle travels underneath the gill organ with a projecting annex portion 42, which is formed in the shape of a flat or shallow spoon 43, during which action the connecting point of the gill arches and the fish body lie in a gap or cut-out 44. Simultaneously, a springloaded clamping holder 45 is lowered onto the spoon surface, such that the gullet and the gills are clamped or caught therein. This has the desired result that, upon withdrawal of the suction nozzle 41, the gullet is torn off and the gill organ is torn out. In the ensuing brushing process, which is carried out with an ample supply of water, any entrails and blood still remaining in the belly cavity are eliminated.

The apparatus, according to the present invention, is well suited for the processing of small batches of fish of varying sizes, as is often the case in breeding businesses. This suitability is due, in particular, to the possibility of equipping the chain conveyor 1 with conveying troughs 5 of different sizes. Geometrically appropriate conveying troughs 5 are formed such that the corresponding fish can be positioned to enable proper processing thereof, with no alteration to the cam drive. For a greater degree of recognizability, the conveying troughs 5 can be marked by colouring according to each unit of size, so that no difficulty arises in determining the respectively matching fish.

What is claimed is:

1. A method for processing non-decapitated fish, in particular breeding fish such as trout, by gutting, the method comprising the steps of
   (a) opening the belly cavity of said fish through slitting the belly walls surrounding the belly cavity, beginning in the anal region, along the belly seam;
   (b) simultaneously with said opening of said belly cavity, releasing the intestine of said fish in the region of the anus from the belly walls;
   (c) removing the entrails through a sucking action while continuously collecting them from the anus towards the head of said fish; and
   (d) seizing in a clamping manner and tearing off in the region of the mouth cavity of said fish, its gullet and, selectively, its gills.

2. An apparatus for processing non-decapitated fish, in particular breeding fish such as trout, by gutting by means of opening the belly cavity of said fish through a slitting action of the belly walls surrounding the belly cavity, beginning in the anal region, along the belly seam; releasing the intestine of said fish in the region of the anus from the belly walls simultaneously when opening the belly cavity; removing the entrails through a sucking action while continuously collecting them from the anus towards the head of said fish; and removing the gullet and, selectively, the gills of said fish by seizing them in a clamping manner and tearing them off in the region of the mouth cavity; said apparatus comprising
   (a) conveyor means, including at least one fish receptacle for the fish to be processed, which supports said fish at least by its back and pushes it with the tail thereof leading in a conveying direction; and
   (b) processing means, which can be moved in a controlled manner with regard to the path of the fish for the purpose of processing the fish according to said method, said processing means including
      (ba) a cutting tool, which is driven to rotate, for opening the belly cavity in the area between the anus and the gill cavity, said cutting tool comprising a circular knife defining a cutting edge and knife flanks, and knife blades associated with said knife flanks and extending essentially radially up to the vicinity of said cutting edge;
      (bb) a spreader for spreading said belly walls;
      (bc) a scraping tool for at least partially opening the bloodstream of said fish arranged downstream of said cutting tool; and
      (bd) entrail removing means for removing the entrails by a suction effect, which entrail removing means include a suction nozzle having a suction opening, which is directed against said conveying direction of said fish.

3. An apparatus as claimed in claim 2, wherein said conveyor means comprise individual, successively arranged conveyor troughs, which, at their leading end, with regard to said conveying direction, are provided with a controlled clamping mechanism for the tail area of said fish and whose trailing end is provided with a head catch reaching over the lower jaw of said fish.

4. An apparatus as claimed in claim 2, wherein said conveyor means are equipped with differently sized conveyor troughs for receiving fish of different size.

5. An apparatus as claimed in claim 3, wherein said conveyor troughs are differently sized for receiving fish of different size.

6. An apparatus as claimed in claim 3, wherein said apparatus comprises a cam drive mechanism for controlling the movement of said processing means, which cam drive mechanism is designed to be driven synchronously with said conveyor means, and said conveyor troughs are designed fish-size dependent relative to a path of controlled movement predetermined by said cam drive mechanism, particularly of said cutting tool with regard to the level of said trough's bottom face supporting the backs of said fish as well as to the portion of said head catch.

7. An apparatus as claimed in claim 4, wherein said apparatus comprises a cam drive mechanism for controlling the movement of said processing means, which cam drive mechanism is designed to be driven synchronously with said conveyor means, and said conveyor troughs are designed fish-size dependent relative to a path of controlled movement predetermined by said cam drive mechanism, particularly of said cutting tool with regard to the level of said trough's bottom face supporting the backs of said fish as well as to the portion of a head catch that reaches over the lower jaw of said fish.

8. An apparatus as claimed in claim 5, wherein said apparatus comprises a cam drive mechanism for controlling the movement of said processing means, which cam drive mechanism is designed to be driven synchronously with said conveyor means, and said conveyor troughs are designed fish-size dependent relative to a path of controlled movement predetermined by said cam drive mechanism, particularly of said cutting tool with regard to the level of said trough's bottom face supporting the backs of said fish as well as to the portion of said head catch.

9. An apparatus as claimed in claim 2, wherein said circular knife is provided with a cutting edge which is generated by symmetrical chamfers, and said knife blades have at least one blade edge leading in a direction of rotation of said circular knife, which blade edge is sharpened by a knife blade chamfer at least in the area of its portion projecting into the area of said symmetrical chamfers, said knife blade chamfer being arranged on the face of said knife blade facing said flank of said circular knife.

10. An apparatus as claimed in claim 2, wherein said scraping tool comprises a spade-shaped element having an outer contour which is essentially adapted to the cross-sectional shape of the belly cavity of said fish, said spade-shaped element being provided, at least in its portion penetrating most deeply into the belly cavity of said fish, with a sharp contour edge facing counter said conveying direction of movement.

11. An apparatus as claimed in claim 2, wherein said suction nozzle comprises a housing having a portion penetrating into the belly cavity of the fish, which portion is adapted essentially to the cross-sectional shape of the belly cavity.

12. An apparatus as claimed in claim 2, wherein said suction nozzle has a portion penetrating into the belly cavity of said fish provided with a shovel-like annex portion.

13. An apparatus as claimed in claim 11, wherein said belly-cavity-penetrating housing portion is provided with a shovel-like annex portion.

14. An apparatus as claimed in claim 12, wherein said annex portion is designed with lateral bounding faces forming deflecting edges which rise from the leading end of said annex portion in said conveying direction.

15. An apparatus as claimed in claim 13, wherein said annex portion is designed with lateral bounding faces forming deflecting edges which rise from the leading end of said annex portion in said conveying direction.

16. An apparatus as claimed in claim 12, wherein said shovel-like annex portion is shaped as a shallow spoon.

17. An apparatus as claimed in claim 13, wherein said shovel-like annex portion is shaped as a shallow spoon.

18. An apparatus as claimed in claim 14, wherein said apparatus comprises a clamping device controlled separately for temporarily fixing the entrails of said fish and associated with said shovel-like annex portion.

19. An apparatus as claimed in claim 15, wherein said apparatus comprises a clamping device controlled separately for temporarily fixing the entrails of said fish and associated with said shovel-like annex portion.

20. An apparatus as claimed in claim 16, wherein said apparatus comprises a clamping device controlled separately for temporarily fixing the entrails of said fish and associated with said shovel-like annex portion.

* * * * *